(12) United States Patent
Spruck et al.

(10) Patent No.: US 8,049,680 B2
(45) Date of Patent: Nov. 1, 2011

(54) METHOD FOR IMPROVING VISION OF A LOW-VISION PERSON AND VIEWING AID

(75) Inventors: Bernd Spruck, Moegglingen (DE); Birgit Rottenkolber, Schwaebisch Gmuend (DE); Simon Brattke, Oberkochen (DE); Martin Edelmann, Aalen (DE); Norbert Wurscher, Aalen (DE); Ruediger Landsinger, Boebingen (DE)

(73) Assignee: Carl Zeiss AG, Oberkochen (DE)

( * ) Notice: Subject to any disclaimer, the term of this patent is extended or adjusted under 35 U.S.C. 154(b) by 1657 days.

(21) Appl. No.: 11/295,799

(22) Filed: Dec. 7, 2005

(65) Prior Publication Data

US 2006/0147197 A1 Jul. 6, 2006

(30) Foreign Application Priority Data

Dec. 8, 2004 (DE) .................. 10 2004 059 249
Jan. 6, 2005 (DE) .................. 10 2005 000 820

(51) Int. Cl.
*G09G 5/00* (2006.01)
(52) U.S. Cl. ............ 345/8; 345/9; 345/55; 345/204
(58) Field of Classification Search ............ 345/8, 9, 345/55, 204
See application file for complete search history.

(56) References Cited

U.S. PATENT DOCUMENTS

| | | | |
|---|---|---|---|
| 3,696,391 A * | 10/1972 | Peronneau | 345/13 |
| 4,581,710 A * | 4/1986 | Hasselmeier | 358/1.17 |
| 5,125,046 A | 6/1992 | Siwoff | |
| 5,579,026 A | 11/1996 | Tabata | |
| 5,583,956 A | 12/1996 | Aghajan et al. | |
| 5,629,988 A | 5/1997 | Burt et al. | |
| 5,862,260 A * | 1/1999 | Rhoads | 382/232 |
| 6,084,556 A * | 7/2000 | Zwern | 345/8 |
| 6,415,064 B1 | 7/2002 | Oh | |
| 6,731,326 B1 | 5/2004 | Bettinardi | |
| 6,891,978 B1 * | 5/2005 | Takano | 382/284 |
| 2003/0097262 A1 * | 5/2003 | Nelson | 704/235 |
| 2003/0215155 A1 * | 11/2003 | Serrano et al. | 382/254 |
| 2004/0100666 A1 * | 5/2004 | Bradbery | 358/479 |
| 2004/0252077 A1 * | 12/2004 | Terasaki | 345/8 |
| 2005/0265535 A1 * | 12/2005 | Kanada | 379/202.01 |
| 2006/0005846 A1 * | 1/2006 | Krueger et al. | 128/898 |
| 2006/0217981 A1 * | 9/2006 | Mahmudovska et al. | 704/260 |

FOREIGN PATENT DOCUMENTS

| | | |
|---|---|---|
| DE | 199 24 144 A1 | 12/1999 |
| JP | 2002-141841 A * | 5/2002 |
| WO | WO 00/64140 | 10/2000 |
| WO | WO 01/88896 A1 | 11/2001 |

* cited by examiner

*Primary Examiner* — Richard Hjerpe
*Assistant Examiner* — Leonid Shapiro
(74) *Attorney, Agent, or Firm* — Harness, Dickey & Pierce, P.L.C.

(57) ABSTRACT

A method for improving vision of a low-vision person and a viewing aid therefore are disclosed. An image is recorded by means of an image recording device, the image being intermediately stored within an image memory and modified and presented to the eyes of the person by means of an image display device being mounted on the head of the person. An image is recorded within a recording mode and the modified image is transferred to the image display device within a display mode. The display mode is initiated in an interval in time with regard to the image recording mode, the interval in time being manually adjustable.

11 Claims, 3 Drawing Sheets

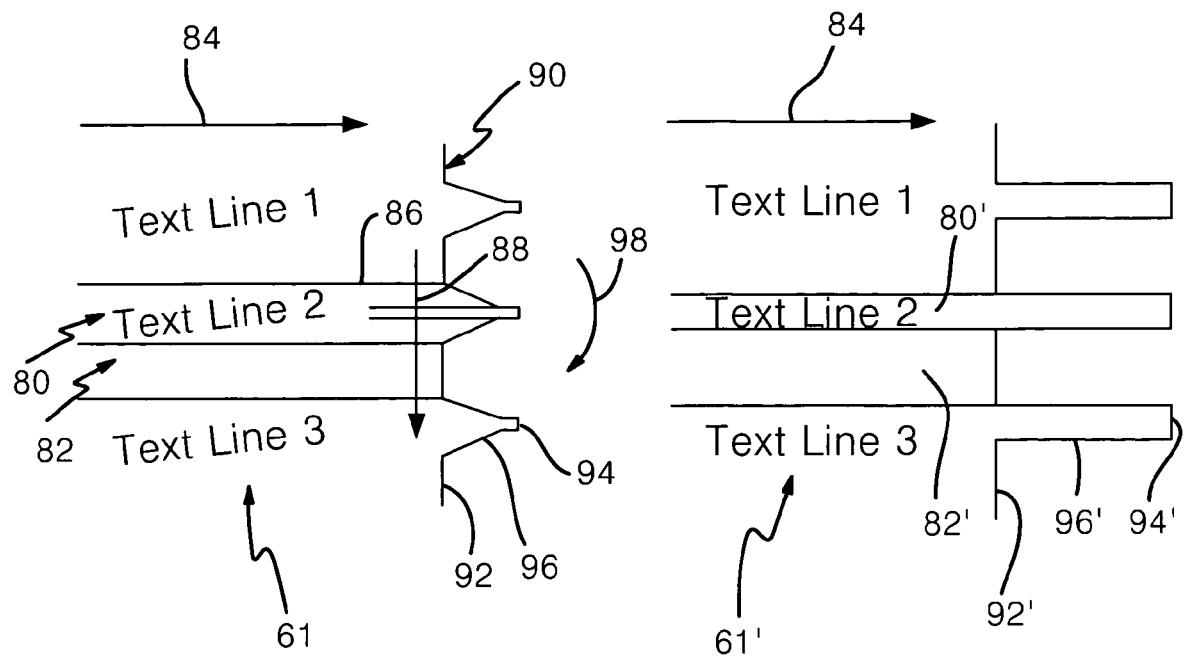
Fig. 4
Fig. 5
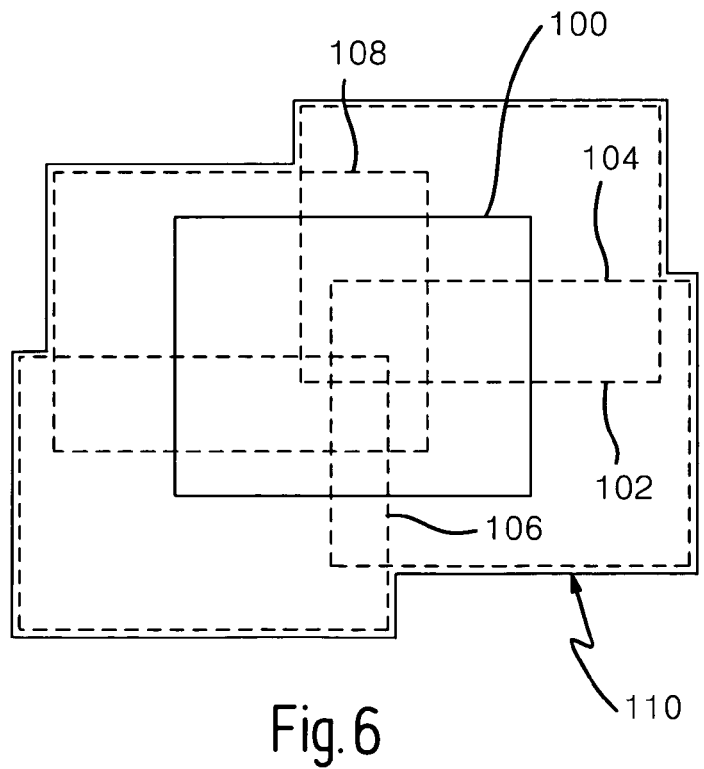
Fig. 6

METHOD FOR IMPROVING VISION OF A LOW-VISION PERSON AND VIEWING AID

FIELD OF THE INVENTION

The present invention is related to the field of methods for improving vision of low-vision persons and of viewing aids.

More specifically, the invention is related to a method for improving vision of a low-vision person, wherein an image is recorded by means of an image recording device, the image being intermediately stored within an image memory, and modified, and presented to the eyes of the person by means of an image display device being mounted to the head of the person.

Still more specifically, the invention is related to a viewing aid for low-vision persons, comprising an image recording device for recording an image, an image memory connected to the image recording device, and an image display device connected to the image memory and mounted to the head of the person.

A method and a viewing aid of the type specified before are disclosed in document U.S. Pat. No. 6,731,326 B1.

BACKGROUND OF THE INVENTION

For low-vision persons having a visus of less than about 0.4 special viewing aids have to be used for improving their vision. Among those are, for example, magnifying viewing aids being equipped with a telescopic system. Such viewing aids, thereby, provide a magnified image and, thus, theoretically a better vision, however, in view of the fact that even with small turning movements of the head the angular velocity is increased by the magnification factor, the image becomes blurred due to that movement.

Further, so-called hand scanners have been known as viewing aids. Such scanners are equipped with a magnifying optical system. The recorded image may be viewed via a reading device having a display or screen. The inherent disadvantage of such hand scanners is that an arcuate movement is made due to the manual actuation of the scanner, such that during reading of a text the scanner is moved away from the particular line of the text or the line is even entirely missed. Moreover, a problem occurs to find the beginning of the next text line after the preceding line has come to its end. Although hand scanners have been proposed utilizing roller carriages or linear guide rails, such proposed systems are bulky and heavy.

Further, other devices have been disclosed which use a camera system with a telescopic attachment being all mounted to the head. When doing so, the image provided by the camera is fed to a goggle-type image display device which is also mounted to the head (so-called "head mounted displays"—HMD). The disadvantage of these prior art systems is that the image is also blurred in case the head makes jitter movements. If a low-vision person reads a text with such a system and follows the text line with a turning movement of the head, the superimposed jitter movement results in a substantial reduction of reading ability.

From document U.S. Pat. No. 6,731,326 B1, mentioned at the outset, a viewing aid in various different embodiments has been known.

According to a first embodiment, a stationary camera is used that may be pivoted and zoomed by means of a manual control device. The image recorded by the camera is shown on a screen of a television set. This embodiment, therefore, may only be used for scanning stationary objects and, hence, may only be used in a stationary mode.

According to a second embodiment, the person carries a sensor (so-called "head mouse") at his/her head which allows to control a cursor on a screen by moving the head, in order to mark a particular detail of an object to be magnified. This embodiment, too, is stationary, and its main purpose is to view images.

According to a third embodiment, the person carries a goggle-type image display device as well as a camera. By means of a manual control device, the camera is pivoted and zoomed and the image recorded by the camera is shown in the image display device. This embodiment is intended to be used for mobile purposes, however, it has the already above-mentioned disadvantage, that jitter movements of the head are immediately transferred to the camera, and, hence, deteriorate the quality of the recorded images. This embodiment is, therefore, improper for reading texts.

Document U.S. Pat. No. 6,084,556 A1 discloses a virtual computer monitor. In one embodiment of the monitor (FIG. 6) a video camera is provided for recording an image of an object. The camera is connected to a personal computer (PC) having a conventional WINDOWS?-surface. A person carries an image display device at his/her head, as well as a sensor for sensing head movements. The image display device and the sensor are interleaved via a software of the PC. By means of that software, the person may determine by appropriate movement of his/her head, which detail within the image recorded by the video camera he/she would like to view, for example by means of scrolling. All this happens in real time, i.e. synchronously.

Document U.S. Pat. No. 5,629,988 A1 discloses a system and a method for electronically stabilizing an image, for example an image of a video camera. When doing so, the movement of the video camera is sensed by means of a sensor, and the sensor signal is used for stabilizing the image. By doing so, unwanted jitter movements may be compensated for, which would generate a local displacement of the video camera between two recorded images.

SUMMARY OF THE INVENTION

It is, therefore, an object underlying the invention to provide a method and a viewing aid of the type specified at the outset, such that these disadvantages are avoided. In particular, a method and a viewing aid shall be provided which allow an improved vision for low-vision persons, both under stationary and under mobile circumstances.

According to a method of the type specified at the outset, this object is achieved in that an image is recorded within a recording mode and the modified image is transferred to the image display device within a display mode, the display mode being initiated at an interval in time with regard to the image recording mode, the interval in time being manually adjustable.

With a viewing aid of the type specified at the outset, this object is achieved according to the invention in that the image memory is adapted to be operated in a recording mode and in a display mode, wherein within the recording mode an image is recorded by means of the image recording device and is stored within the image memory and wherein within the display mode the modified image is transferred to the image display device, and that a manually operable input device is provided for initiating the display mode at an adjustable interval in time with regard to the recording mode.

The object underlying the invention is thus entirely solved.

The invention has the advantage that the person may view the image at an offset moment in time. The person, therefore, may record an object first and may view it later at his/her leisure.

In preferred embodiments of the invention, movements of the head are sensed and the image is modified within the image memory as a function of the movement or, respectively, at least one sensor is provided for sensing movements of the head, and the sensor is connected to the image memory such that an image stored within the image memory is modified as a function of the movement and is transferred to the image display device.

Given the fact that an image memory for storing and processing the image recorded by the camera, and being controlled by movements of the head, is arranged between the image recording device and the image display device, the image may be optimized under many aspects in order to correct negative influences which limit the reading ability in conventional viewing aids.

In embodiments of the invention, the image recording device is held manually or is mounted to the head of the person or may be mounted stationary.

These measures have the advantage that one may take into account the specific requirements of a mobile or of a stationary use of the viewing aid.

Preferably, the image recording device is a camera, in particular a line camera. As an alternative, the image recording device within the scope of the present invention may also be another suitable device, for example a scanner, a two-dimensional sensor and the like.

In further preferred embodiments of the invention a plurality of individual images of a total image is recorded first within the recording mode, and the total image is electronically composed from the individual images thereafter.

This measure has the advantage that large-size objects may be recorded first, for example by manually scanning with a camera, and that the more or less arbitrary individual images are then assembled by electronic image processing to create a seamless total image which, on the one hand, comprises all image contents of interest and, on the other hand, may be viewed in its particularly interesting details at one's leisure.

In a corresponding manner, the invention also provides to first record a total image within the recording mode and to create a detail from the total image thereafter.

This measure has the advantage that a particularly interesting detail may be viewed from a large image or text object at a moment in time that may be determined freely.

Preferably, the detail is created by optically zooming a camera used as the image recording device or by reading only a fraction of the memory contents of a stored high-resolution electronic image.

Insofar, it is preferred to define the detail by means of a manual input device.

Further embodiments of the invention are characterized in that during the recording of a text presented in lines, the text is read line by line into the image memory within the recording mode and is concurrently aligned along the direction of the lines.

This measure has the advantage that the reading of texts is made possible in a simple manner also when the text is recorded along an oblique direction as compared to the direction of the lines or in another uncontrolled manner, in particular as a consequence of manual movements.

Within a preferred first implementation of the afore-mentioned embodiment, the recorded text is integrated with its gray scale value line by line along the direction intended for its display, the position of the lines being varied stepwise orthogonally to the direction, wherein the recorded text, after having been integrated, is rotated within its plane as long as, and with the integration being repeated until, the transition of the integrals of the gray scale value along the lines in the transition from a text line to an adjoining space has a maximum steepness.

This measure has the advantage that a reliable and easily applicable criterion is used for correctly aligning the text lines along the reading direction, namely by using a control aiming at a maximum value of the gray scale integral.

According to a second implementation, the recorded text is subjected to a 2D-Fourier-transformation and is rotated within its plane as a function of the transformation result until the lines of the recorded text extend parallel to a direction intended for the display.

According to another embodiment of the invention, the modified image is shown within the display mode line by line within the image display device, wherein the lines are shown in a sweep, and the sweep speed is set as a function of the movements preferably proportional to the angular velocity during turning of the head.

This measure has the advantage that the person may control the sweep speed of the text within the image display devices sensitively by a movement of his/her head.

Insofar, it is particularly preferred when the modified image is magnified, the magnification factor being set as a function of the movements, preferably inverse-proportionally to an angular velocity during the turning of the head.

This measure has the advantage that an automatic adaptation of the magnification to the sweep speed as desired by the head movement, is achieved which, of course, may also be realized in the opposite way, when the sweep speed is adjusted depending on the desired magnification.

It is further preferred when during the presentation of a text shown in lines the presentation jumps from the end of a line to the beginning of the subsequent line upon a movement of the head in the direction of the text or, vice versa, when during the presentation of a text shown in lines, the presentation jumps from the beginning of a line to the end of the preceding line upon a movement of the head opposite to the direction of the text.

This measure has the advantage that the transition from one text line to the other may be effected reliably and the next line must not be searched, for example manually.

If no automatic switching of the text lines is desired, it is preferred when the jump is initiated by a nodding movement of the head.

This measure has the advantage that the person may determine by himself/herself, if and when he/she wants to continue with the reading of the next line.

According to further embodiments of the invention, a compensation of jitter movements of the head is effected within the image memory.

This measure has the advantage that the sensors that are anyway mounted to the head of the person may be used for compensating jitter movements which might otherwise result in blurring of the image.

In a particularly preferred embodiment which may also be used alone, the movements are the movements are detected by means of an image recording device being manually held by the person or being mounted to head of the person, and, resp., the at least one sensor is configured as an image recording device being manually held by the person or being mounted to the head of the person.

These measures have the advantage that separate sensors are not needed because the movements of the hand or of the head may directly be derived from the images recorded by the camera.

Finally, an inventive method is preferred in which during a presentation of a text line by line, the text is in parallel outputted as a speech signal.

The advantages given above for various embodiments of the inventive method hold true, mutatis mutandis, for corresponding embodiments of inventive viewing aids, of course.

In embodiments of inventive viewing aids, means are provided for first recording a plurality of individual images within the recording mode and for subsequently composing a total image from the individual images. These means may be configured as a zoom lens of the camera or as an electronic circuit which reads only a fraction of the memory contents from a stored high-resolution electronic image.

Insofar, it is particularly preferred when a manual input device is provided, for example a mouse, for defining the detail, in particular for setting a magnification.

In this context, it is particularly preferred when the input device is adapted to be lifted off a support and comprises means for detecting a distance from the support, wherein the detail is defined as a function of the distance, in particular a magnification of the detail is set as a function of the distance.

This measure has the advantage that a "virtual magnifying glass" is realized, the handling of which corresponding to that of conventional magnifying glasses.

In other embodiments of the invention a hand scanner is, further, connected to the image memory, wherein output signals from the hand scanner are adapted to be read into the image memory as an alternative to the output signal from a camera.

This measure has the advantage that the inventive viewing aid may be used under many different circumstances.

Further, it is preferred when the image display device is pivotably mounted to a spectacle, such that in a first position it is arranged outside the field of vision of the spectacle and in a second position it is arranged inside the field of vision of the spectacle.

This measure has the advantage that the person may roughly orientate himself/herself in a certain environment, for example with the help of a conventional spectacle and, for viewing details, for example for reading a text, may use the viewing aid by simply lowering the image display devices in front of the spectacle glasses.

Further advantages will become apparent from the description and the enclosed drawing.

It goes without saying that the features mentioned before and those that will be explained hereinafter, may not only be used in the particularly given combination, but also in other combinations or alone, without leaving the scope of the present invention.

BRIEF DESCRIPTION OF THE DRAWINGS

Embodiments of the invention are shown in the drawing and will be explained in further detail in the subsequent description.

FIG. 4 is an illustration of an image consisting of text lines for explaining a particular feature of the inventive viewing aid, in a first method step;

FIG. 5 is an illustration, similar to that of FIG. 4, however, for a second method step; and FIG. 6 is a likewise highly schematic illustration for explaining another feature of the inventive viewing aid.

DETAILED DESCRIPTION OF THE PREFERRED EMBODIMENTS

Figure 1:
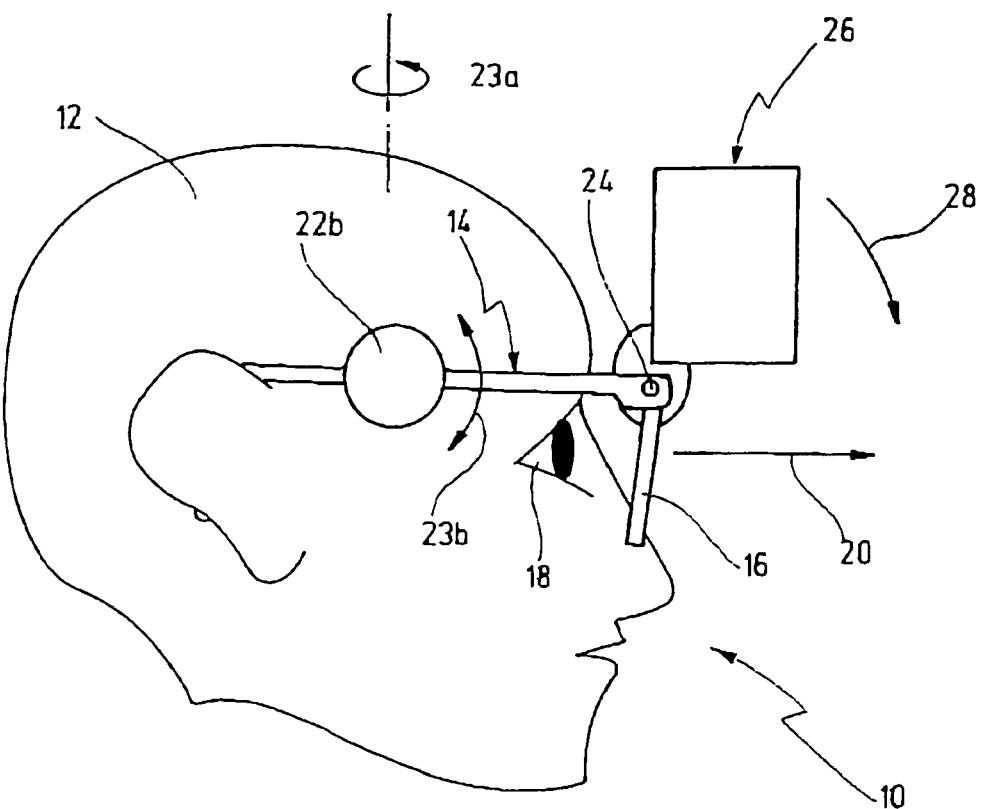
FIG. 1 shows the head of a low-vision person in a side-elevational view, wherein the person carries components of an embodiment of an inventive viewing aid at his/her head, and wherein, further, an image display device of the viewing aid is in a first operational position.
Figure 3:
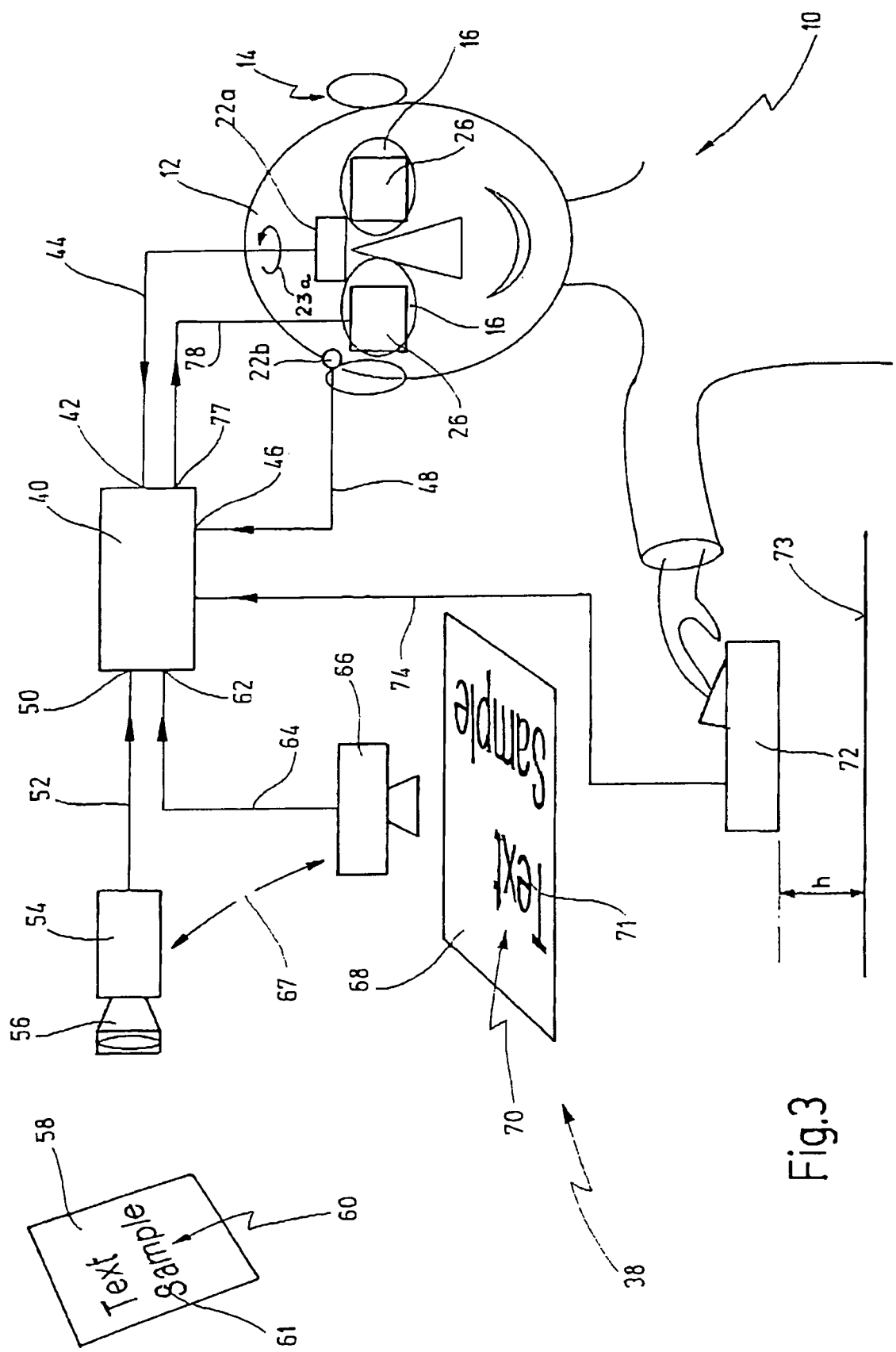
FIG. 3 is a highly schematic complete illustration of an inventive viewing aid.

In FIGS. 1 and 3, reference numeral 10 indicates a low-vision person. For the described embodiment it shall be assumed that person 10 still has as much vision that he/she may orientate himself/herself roughly within his/her environment, however, that his/her vision is insufficient to properly perceive details, for example to read a text.

Person 10 at his/her head 12 carries a spectacle 14 with conventional optical lenses 16. Lenses 16 are optimized with respect to the aforementioned rough orientation of the person 10 within his/her environment. An eye of person 10 is indicated at 18 and the direction of vision or field of vision, respectively, is denoted as 20. In FIG. 1 spectacle 14 is used conventionally. Person 10 looks only through lenses 16.

In such a way, person 10 may move within his/her environment. If, for example, person 10 is at a train station, person 10 may be able to find his/her way. However, if he/she, for example, wishes to study a train schedule hanging out, his/her vision may not be sufficient to properly read the text of the train schedule. The vision of person 10 is so low that it may not be sufficiently enabled with a conventional high optical power spectacle. Therefore, to assist person 10 in such a situation, the invention provides for other measures.

Spectacle 14 is provided with sensors, a first sensor 22a of which being arranged in the center between spectacle lenses 16, as shown in FIG. 3, and a second sensor 22b being located laterally on a spectacle frame side piece, as shown in FIG. 1. The number and position of sensors 22a and 22b, of course, is only to be understood as an example. First sensor 22a, as shown in FIG. 3 with an arrow 23a, is a gyro sensor sensing a turning or rotating movement of head 12, as typically occurs during the reading of lines of a text. Second sensor 22b, in contrast, is an inclination sensor, as indicated by an arrow 23b in FIG. 1, and senses a nodding movement of head 12. Sensors 22a and 22b, therefore, allow to sense arbitrary intended movements of head 12, but also unintended movements, for example jitter movements as caused by age or by a disease.

Already at this instance it should be mentioned that the movements of head 12 together with a camera mounted thereto or of a hand holding a camera, may be detected directly and without the use of sensors by appropriately processing subsequent images recorded by the camera.

Figure 2:
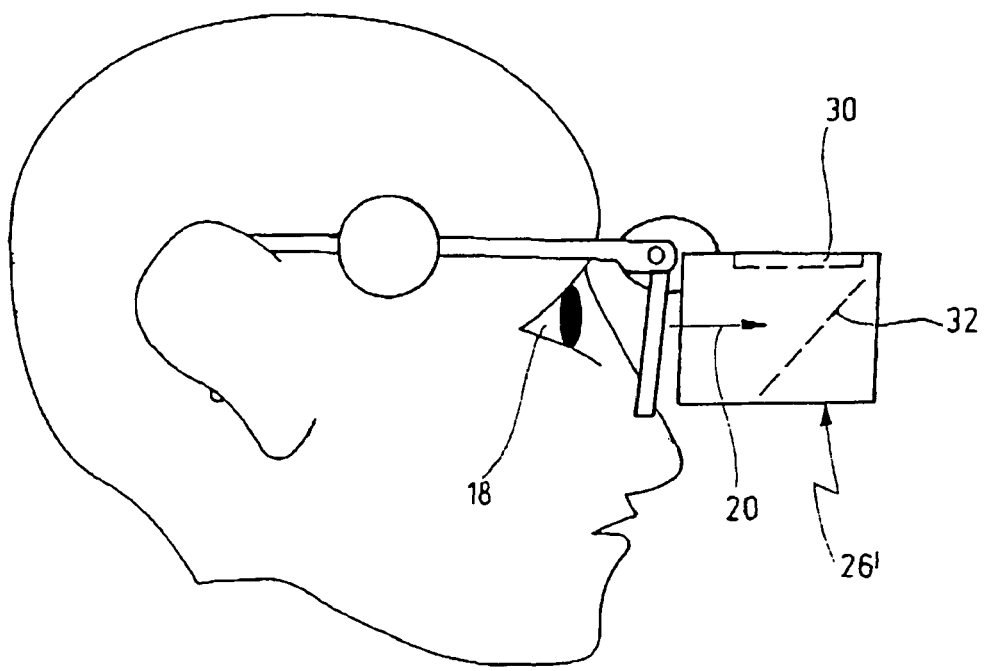
FIG. 2 is an illustration, similar to that of FIG. 1, however, with the image display device being in a second operational position.

In the area next to lenses 16, spectacle 14 is provided with joints 24. Image display devices 26 are pivotably mounted to joints 24 above lenses 16. As shown in a first operational position in FIG. 1, image display devices 26 may be pivoted upwardly out of the field of vision 20 of person 10, however, they may also be pivoted downwardly in the direction of an arrow 28, until they assume a second position 26' shown in FIG. 2. In this second position 26', direction of vision 20 of eyes 18 goes into image display device 26.

Image display device 26, on an upper side of its interior, may, for example, be provided with a display 30. The image thereof is deflected into direction of vision 20 by means of a deflection mirror 32, such that eyes 18 of person 10 see the image displayed on display 30. Image display device 26 is shown in the Figures only as an example. It may be varied in many ways. Head-mounted image display devices of the type of interest in the context of the present application are generally known as "head mounted displays" (HMD) and are commercially available.

FIG. 3 shows details of the inventive viewing aid, being designated as a whole with reference numeral 38.

Viewing aid 38 comprises an image memory 40 as a central unit. Image memory 40, insofar, not only comprises memory elements but also processors for processing signals and data as well as the necessary periphery. These elements are well known to the person or ordinary skill and, therefore, are not shown in FIG. 3 for the sake of simplicity.

A first input 42 of image memory 40 is connected to first sensor 22a via an electric line 44.

A second input 46 is connected to second sensor 22b via an electric line 48.

A third input 50 is connected to an image recording device via an electric line 52. In the embodiment shown, the image recording device is configured as a camera 54. It goes, however, without saying that other two-dimensional sensors may likewise be used as image recording devices, for example a scanner. Camera 54, preferably, is an electronic line camera having a CCD-image sensor for recording images electronically point- and linewise. Camera 54 is preferably equipped with a zoom lens 56.

Camera 54 may be positioned in various ways. According to a first implementation, camera 54 is mounted on a tripod and, for example, records the pages of a book lying in front of camera 54 on an appropriate stand, the pages being turned one after the other. According to a second implementation, camera 54 is carried by hand, for example by person 10 himself/herself, who points to a particular object himself/herself. According to a third implementation, camera 54 is carried by head 12 of a person 10. It may, for example, be positioned near image display device 26 or may be structurally integrated with the latter, such that in this implementation the direction of vision of a camera 54 essentially coincides with the direction of vision 20 of person 10.

As already mentioned, camera 54 may concurrently be used as a sensor for detecting movements of head 12 or of a hand. For that purpose, subsequent images of camera 54 are analyzed and a motion vector is derived therefrom.

In FIG. 3, camera 54 is directed to an object 58. Object 58 shows an image 60, in the example shown being a text 61. In the above-described example, in which person 10 is at a train station, person 10 carries camera 54 with him/her in his/her hand or at his/her head 12 and text 61 is the train schedule hanging out in the train station hall.

A fourth input 62 of image memory 40, being provided as an option, is connected to a scanner 66 via an electric line 64. Scanner 66 may, for example, be a hand scanner, i.e. a sensor guided by hand, for scanning an object 68. Object 68 shows an image 70, for example likewise a text 71. Object 68 may, for example, be a book or a newspaper lying on a table, in order to be read by person 10 by means of scanner 66. Via a switch, indicated by an arrow 67 in FIG. 3, viewing aid 38 may be switched from a first operational mode with camera 54 to a second operational mode with scanner 66.

Another typical application of the invention is the use of the viewing aid of FIG. 3 in the context of a lecture for low-vision persons. During theses lectures the participants one the one hand must follow the explanations of the lecturer or teacher, resp., and, on the other hand, must view or read their teaching materials.

This may be easily accomplished with the viewing aid of FIG. 3. Person 10 preferably uses camera 54 mounted to his/her head 12 for following the lecturer and, as may be necessary, switches over to scanner 66 by means of switch 67 for reading text 71 in a textbook or view image 70 in a teaching document, for example.

In FIG. 3, reference numeral 72 designates a manual input device. Input device 72, in a simple implementation, may be a switch, however, for more complex functions, it may also be a mouse, a keyboard or a combination of the aforementioned elements. Input device 72 controls functions of viewing aid 38.

Person 10, for example, may search areas within an image or may magnify same. In order to set the magnification factor, input device 72 may be configured as a "virtual magnifying glass". For that purpose, one lifts same off from a support 73 as a conventional lens magnifying glass, detects the distance h from the support 73 by means of a sensor, and uses distance h as a control signal for the magnifying factor. If, for example, person 10 in that case selects a detail from an image by means of input device 72 and then lifts input device 72 off, the selected detail will be magnified the more, the more person 10 lifts input device 72 off support 73.

An output 77 of image memory 40 is finally connected to image display device 26 via an electric line 78.

Viewing aid 38 operates as follows:

Camera 54, for example, records image 60 of FIG. 3. Recorded image 60 is now processed within image memory 40 and is transferred to image display devices 26 in a modified format.

Image memory 40 is adapted to be operated in two operational modes. In a first mode, a recording mode, image memory 40 inputs an image, for example text 61 of object 58 as recorded by camera 54. The input data are processed within image memory 40 so that they are adapted for being displayed in image display devices 26. In a second operational mode, a display mode, the processed or modified, respectively, image is then transferred to image display devices 26.

The recording mode and the display mode are executed one after the other in time. Person 10, therefore, will first record a particular image with camera 54 and will view same only later in an appropriately processed, enhanced or modified format.

In the example described above, person 10 in a railway station hall may record the train schedule hanging out with camera 54 by making appropriate movements with his/her head or hand, respectively, i.e. scanning same. Person 10 may then proceed to another, more quiet location, where he/she is not disturbed by other persons. Person 10 may then view at his/her leisure the train schedule stored as an image by using image display devices 26, may read the lines forward or backward, may view particular details on a magnified scale, etc. This, of course, assumes that viewing aid 38 is capable of assembling an image of the train schedule that is complete and aligned along the direction of the lines of the text, from the more or less controlled movements of the head or the hand of person 10. This will be explained in further detail below.

Viewing aid 38, further, may create details of images. This may be simply effected on the one hand by appropriately setting zoom lens 56 of camera 54. On the other hand, an electronic zoom may also be used, in which, by appropriately selecting data defining pixels, a detail of an image is created from an image being available as a set of data, wherein, the image detail may be shown as a magnification with a larger pixel distance. Of course, the image resolution becomes poor in such an electronic zoom, and, therefore, in such cases a camera 54 should be used having a high image resolution. It might also be advisable to use a wide angle lens in order to obtain an initial image as large as possible, comprising all image information of interest. In the simplest case, camera 54 may have a substantial larger number of pixels, as compared to image display device 26, so that a detail, without magnification, may simply be created by only transferring a particular fraction of the pixels to the image display device.

It was already mentioned that person 10 may set the position of the particular detail and the magnification thereof, for example by means of input device 72.

In an essential basic function, viewing aid 38 enables person 10 in particular to perceive or to read, respectively, texts, when person 10 controls the reading of the text from image memory 40 and the presentation thereof within image display device 26 by moving his/her head 12.

If, in the displayed mode, person 10 wishes to read a text stored in image memory 40, the text is presented as a still image, for example as a line of text within image display devices 26. For a continued reading, person 10 must then turn his/her head 12, as is the case during conventional reading. When doing so, first sensor 22a detects a turning movement 23a of head 12 as is typical during reading, and converts same into a corresponding sweep speed for the reading of the text line from image memory 40. In order to ensure that this conversion remains sensitive, viewing aid 38 takes into account the rotational or angular speed of head 12, as well as the prevailing magnification of the representation of a text 61 within image display devices 26. If, namely, person 10 reads a text line with a high magnification, the sweep or reading speed from image memory 40 is set inverse proportionally to the angular speed of turning 23a of head 12, because a magnified text must be read slower as compared to a text with higher magnification in which a larger amount of text is visible. Vice versa, the magnification may automatically follow the prevailing angular velocity. The same holds true for the viewing of textless images, if person 10 wishes to view the image like a panorama in one turning movement 23a of head 12.

When reading texts, the already mentioned problem frequently arises, that the texts have not been recorded in a direction parallel to the direction of the text lines. This problem mostly occurs when the text is recorded with a camera guided by hand or by head or by a manual scanner. In such a case, the movements of these recording elements are often entirely irregular and, in any event, not straight. The inventive viewing aid, therefore, provides for an option implemented in image memory 40, as illustrated in FIGS. 4 and 5. FIG. 4 shows that text 61 with its text lines 80 and spaces 82 between text lines 80 was recorded in a direction being inclined with regard to a first direction 84 corresponding to the reading direction. In order to correctly align text 61, text 61 is now scanned along a line 86 extending parallel to first direction 84. When scanning line 86, the gray scale value along line 86 is integrated. Line 86 is then stepwise shifted along a second direction 88 extending perpendicular with regard to first direction 84 and, again, the gray scale value is integrated along the shifted line. By doing so, text 61 is entirely scanned.

The integral of the gray scale value as was measured for every line, is now plotted along second direction 88 as shown in a graph 90. As can easily be seen from FIG. 4, graph 90 shows a minimum 92 in the area where line 86 only runs through a space 82, and has a maximum 94 where it only runs through a text line 80. Therebetween are transitions 96 in the area where line 86 partially runs through a text line 80 and then through a space 82. The steepness of transitions 96 depends on the inclination of a text 61 relative to first direction 84.

By selecting the maximum value as a control value, text 61 may now be rotated within its plane, as indicated by an arrow 98, until it assumes a correct alignment as shown in FIG. 5 in which the steepness of transitions 96' is at a maximum. In FIG. 5 all rotated elements are designated by an apostrophe in addition to the particular reference numeral.

As an alternative to the afore-described method, rotated text 61' may also be recorded two-dimensionally and may be subjected to a 2D-Fourier-transformation which likewise provides a signal adapted for control purposes and indicating the degree of rotation. Appropriate software is known to the person of ordinary skill.

Viewing aid 38, therefore, modifies an image of a text 61, as recorded by camera 54, for example, into a text 61' which is made available within image memory 40 for a presentation within image display devices 26. Person 10 may, hence, view and read the modified text 61' in its correct alignment.

When text 61 has been brought into its correctly aligned position 61', it is easily possible to provide for a line jump. If person 10, during reading of a text line 80, has arrived at the end thereof, one may either automatically switch to the beginning of the next text line, or the person initiates the switching operation by a nodding movement of his/her head 12 which is detected by inclination sensor 22b. The same may, of course, be also realized backwardly, if the person wishes to return to an earlier position within the text and, hence, views the text line in an inverted direction for that purpose. Then, as soon as the beginning of the text line is reached, an automatic switch is effected to the end of the preceding text line, be it automatically or through a nodding movement in the opposite direction.

It was already mentioned above that, in particular for a separation in time of the recording mode and the display mode, it is important to ensure that during the recording the entire information of interest is actually recorded. It is likewise important for a recording which was generated by a manual scanning or a scanning through head movement, to ensure that a complete and true total image was generated. For that purpose, another option is realized within image memory 40 of viewing aid 38 which shall now be explained with regard to FIG. 6.

In FIG. 6, reference numeral 100 designates an image that is recorded by person 10, for example after the switching-on or after the aiming of camera 54. This picture, however, only encompasses a fraction of the entire object area of interest, for example because the lens has a long focus. By pivoting the camera in a circular movement, partial images 102, 104, 106, and 108 being all shifted with respect to each other, are now recorded and stored one after the other. By means of appropriate software, these partial images 100-108 may now be assembled such that a seamless total image 110 is created in which the overlapping areas of partial images 100-108 have been calculated away or have been interleaved with each other for improving the image quality. Such software is well known to the person of ordinary skill.

Finally, another option as realized within image memory 40 allows to compensate for a jitter movement of camera 54. If, for example, camera 54 is mounted to head 12 of person 10, such a jitter movement may be detected by means of sensors 22a and 22b. Software for compensating jitter are also well known to the person of ordinary skill.

Finally, in case of the reading of a text line by line, still another option may be implemented, in which a speech signal of the text is generated and fed to an appropriate loudspeaker or the like (not shown).

The invention claimed is:

1. A method for improving vision of a low-vision person, comprising the steps of:
   initiating a recording mode
   recording an image by means of an image recording device within said recording mode,
   intermediately storing said image within an image memory within said recording mode,
   sensing movement of the head of the person,
   modifying said image within said image memory as a function of said movement to create a modified image within said recording mode,
   initiating a display mode at a distance in time with regard to said image recording mode, said distance in time being manually adjusted by said person,
   transferring said modified image to an image display device being mounted to a head of said person within said display mode, and
   presenting said modified image to eyes of said person by means of said image display device within said display mode
   wherein during recording of a text presented in lines, said text is read line by line into said image memory within said recording mode and is concurrently aligned along said direction of said lines, and further wherein said recorded text is integrated with a gray scale value thereof line by line along a direction intended for a display of said text, a position of said lines being varied stepwise orthogonally to said direction, said recorded text after having been integrated being rotated within a plane thereof as long as and with said integration being repeated, until a transition of said integrals of said gray scale value along said lines in a transition from a text line to an adjoining space has a maximum steepness.

2. A method for improving vision of a low-vision person, comprising the steps of:
   initiating a recording mode
   recording an image by means of an image recording device within said recording mode,
   intermediately storing said image within an image memory within said recording mode,
   sensing movement of the head of the person,
   modifying said image within said image memory as a function of said movement to create a modified image within said recording mode,
   initiating a display mode at a distance in time with regard to said image recording mode, said distance in time being manually adjusted by said person,
   transferring said modified image to an image display device being mounted to a head of said person within said display mode, creating a recorded text image that and
   presenting said modified image to eyes of said person by means of said image display device within said display mode
   wherein during recording of a text presented in lines, said text is read line by line into said image memory within said recording mode and is concurrently aligned along said direction of said lines, and further wherein said recorded text image is modified within said image memory to create said modified image by subjecting the recorded text image subjected to a 2D-Fourier-Transformation and is rotated within a plane thereof as a function of a transformation result until said lines of said recorded text extend parallel to a direction intended for a display of said text.

3. A method for improving vision of a low-vision person, comprising the steps of:
   initiating a recording mode,
   recording an image by means of an image recording device within said recording mode,
   intermediately storing said image within an image memory within said recording mode,
   modifying said image within said image memory to create a modified image within said recording mode,
   initiating a display mode at a distance in time with regard to said image recording mode, said distance in time being manually adjusted by said person,
   transferring said modified image to an image display device being mounted to a head of said person within said display mode, and
   presenting said modified image to eyes of said person by means of said image display device within said display mode,
   wherein during recording of a text presented in lines, said text is read line by line into said image memory within said recording mode creating a recorded text image that is concurrently aligned along said direction of said lines, and wherein movements of said head are sensed, said recorded text image being modified within said image memory as a function of said movements to create said modified image, and further wherein said modified image is shown within said display mode line by line within said image display device, said lines being shown in a sweep, a speed of said sweep being set as a function of said movements, preferably proportional to an angular velocity during turning of said head.

4. A method for improving vision of a low-vision person, comprising the steps of:
   initiating a recording mode,
   recording an image by means of an image recording device within said recording mode,
   intermediately storing said image within an image memory within said recording mode,
   modifying said image within said image memory to create a modified image within said recording mode,
   initiating a display mode at a distance in time with regard to said image recording mode, said distance in time being manually adjusted by said person,
   transferring said modified image to an image display device being mounted to a head of said person within said display mode, and
   presenting said modified image to eyes of said person by means of said image display device within said display mode,
   wherein during recording of a text presented in lines, said text is read line by line into said image memory within said recording mode creating a recorded text image that is concurrently aligned along said direction of said lines, and wherein movements of said head are sensed, said recorded text image being modified within said image memory as a function of said movements to create said modified image, and further wherein said modified image is magnified, a corresponding magnification factor being set as a function of said movements, preferably inverse-proportionally to an angular velocity during turning of said head.

5. A method for improving vision of a low-vision person, comprising the steps of:
initiating a recording mode,
recording an image by means of an image recording device within said recording mode,
intermediately storing said image within an image memory within said recording mode,
modifying said image within said image memory to create a modified image within said recording mode,
initiating a display mode at a distance in time with regard to said image recording mode, said distance in time being manually adjusted by said person,
transferring said modified image to an image display device being mounted to a head of said person within said display mode, and
presenting said modified image to eyes of said person by means of said image display device within said display mode,
wherein during recording of a text presented in lines, said text is read line by line into said image memory within said recording mode creating a recorded text image that is concurrently aligned along said direction of said lines, and wherein movements of said head are sensed, said recorded text image being modified within said image memory as a function of said movements to create said modified image, and further wherein during presentation of a text shown in lines, said presentation jumps from an end of a line to a beginning of a subsequent line upon a movement of said head in a direction of said text.

6. The method of claim 5, wherein said jump is initiated by a nodding movement of said head.

7. A method for improving vision of a low-vision person, comprising the steps of:
initiating a recording mode,
recording an image by means of an image recording device within said recording mode,
intermediately storing said image within an image memory within said recording mode,
modifying said image within said image memory to create a modified image within said recording mode,
initiating a display mode at a distance in time with regard to said image recording mode, said distance in time being manually adjusted by said person,
transferring said modified image to an image display device being mounted to a head of said person within said display mode, and
presenting said modified image to eyes of said person by means of said image display device within said display mode,
wherein during recording of a text presented in lines, said text is read line by line into said image memory within said recording mode creating a recorded text image that is concurrently aligned along said direction of said lines, and wherein movements of said head are sensed, said recorded text image being modified within said image memory as a function of said movements to create said modified image, and further wherein during presentation of a text shown in lines, said presentation jumps from a beginning of a line to an end of a preceding line upon a movement of said head opposite to a direction of said text.

8. The method of claim 7, wherein said movements of said head are detected by means of an image recording device mounted to said head of said person for recording multiple images and extracting movement information by monitoring changes in said images.

9. The method of claim 7, wherein during a presentation of a text line by line, said text is in parallel outputted as a speech signal.

10. A viewing aid for a low-vision person, comprising an image recording device for recording an image, an image memory connected to said image recording device and an image display device connected to said image memory and mounted to a head of said person, said image memory being adapted to be operated in a recording mode and in a display mode, wherein, within said recording mode an image is recorded by means of said image recording device and is stored within said image memory and within said display mode a modified image is transferred to said image display device, a manually operable input device being provided for initiating said display mode at an adjustable distance in time with regard to said recording mode, means being also provided for first recording a total image within said recording mode and for subsequently creating a detail from said total image, and a manually operable input device being provided for defining said detail, in particular for defining a magnification, said input device being adapted to be lifted off a support and comprises means for detecting a distance from said support, said detail being defined as a function of said distance, in particular a magnification of said detail is set as a function of said distance.

11. A viewing aid for a low-vision person, comprising an image recording device for recording an image, an image memory connected to said image recording device, and an image display device connected to said image memory and mounted to a head of said person, wherein said image memory is adapted to be operated in a recording mode and in a display mode, wherein, further, within said recording mode an image is recorded by means of said image recording device and is stored within said image memory wherein movements of said head are sensed and said recorded image is modified as function of said movements to create a modified image and wherein within said display mode said modified image is transferred to said image display device, a manually operable input device being provided for initiating said display mode at an adjustable distance in time with regard to said recording mode, wherein said image display device is pivotably mounted to a spectacle, such that in a first position it is arranged outside said field of vision of said spectacle and in a second position it is arranged inside said field of vision of said spectacle.

* * * * *

UNITED STATES PATENT AND TRADEMARK OFFICE
CERTIFICATE OF CORRECTION

| | | |
|---|---|---|
| PATENT NO. | : 8,049,680 B2 | Page 1 of 1 |
| APPLICATION NO. | : 11/295799 | |
| DATED | : November 1, 2011 | |
| INVENTOR(S) | : Bernd Spruck et al. | |

It is certified that error appears in the above-identified patent and that said Letters Patent is hereby corrected as shown below:

Column 11,
Line 55, delete "creating a recorded text image that".
Line 62, delete "and" and insert -- creating a recorded text image that --.

Column 14,
Line 55, "saidspectacle." should be -- said spectacle. --.

Signed and Sealed this
Sixth Day of March, 2012

David J. Kappos
*Director of the United States Patent and Trademark Office*